(12) United States Patent
Hull et al.

(10) Patent No.: US 7,170,629 B2
(45) Date of Patent: Jan. 30, 2007

(54) AUTOMATIC AND TRANSPARENT DOCUMENT ARCHIVING

(75) Inventors: Jonathan J. Hull, Cupertino, CA (US); Mark Peairs, Menlo Park, CA (US); John Cullen, Redwood City, CA (US); Michael Baxter, Sunnyvale, CA (US)

(73) Assignee: Ricoh Company, Ltd., Tokyo (JP)

(*) Notice: Subject to any disclaimer, the term of this patent is extended or adjusted under 35 U.S.C. 154(b) by 333 days.

(21) Appl. No.: 10/453,859

(22) Filed: Jun. 2, 2003

(65) Prior Publication Data

US 2004/0080786 A1 Apr. 29, 2004

Related U.S. Application Data

(63) Continuation of application No. 09/347,953, filed on Jul. 6, 1999, now Pat. No. 6,665,086, which is a continuation of application No. 09/192,168, filed on Nov. 13, 1998, now Pat. No. 6,684,368.

(51) Int. Cl.
*G06F 3/12* (2006.01)
*G06F 15/00* (2006.01)
*G06K 1/00* (2006.01)

(52) U.S. Cl. .................................. 358/1.15; 358/1.13

(58) Field of Classification Search ............... 358/1.15, 358/402, 403, 407, 442, 443, 444; 709/468, 709/203, 206, 207, 219; 399/1, 8, 38, 79, 399/82, 83; 707/200, 204, 205

See application file for complete search history.

(56) References Cited

U.S. PATENT DOCUMENTS

| | | | |
|---|---|---|---|
| 4,839,741 A | 6/1989 | Wilson | |
| 4,876,609 A | 10/1989 | Ogura | |
| 4,957,689 A | 9/1990 | Ohnishi et al. | |
| 5,241,472 A | 8/1993 | Gur et al. | |
| 5,459,579 A | 10/1995 | Hu et al. | |
| 5,465,353 A | 11/1995 | Hull et al. | |

(Continued)

FOREIGN PATENT DOCUMENTS

JP 05-308450 A 11/1993

(Continued)

OTHER PUBLICATIONS

Engst, A., "Eudora for Windows & Macintosh, visual quickstart guide," pp. xii, 1-5, 10-11, 53-56, 61-65, 74-75, 87-88, 108 and 133-143 (1997).

(Continued)

*Primary Examiner*—Douglas Q. Tran
(74) *Attorney, Agent, or Firm*—Townsend & Townsend & Crew LLP (57) ABSTRACT

An automatic archiving system that makes document archiving largely transparent to the user. In one embodiment, documents scanned in or printed during the course of office equipment operation are automatically archived. For example, an office local area network (LAN) may interconnect a copier, a printer, a fax machine, and a document management workstation. Whenever, a document is copied, printed, or faxed, a document image is archived by the document management workstation without further user intervention. A single user command results in the document being copied and archived, printed and archived, or faxed and archived.

28 Claims, 8 Drawing Sheets

U.S. PATENT DOCUMENTS

| | | |
|---|---|---|
| 5,499,108 A | 3/1996 | Cotte et al. |
| 5,608,786 A | 3/1997 | Gordon |
| 5,619,649 A | 4/1997 | Kovnat et al. |
| 5,642,199 A | 6/1997 | Ukai et al. |
| 5,675,507 A | 10/1997 | Bobo, II |
| 5,689,755 A | 11/1997 | Ataka |
| 5,701,183 A | 12/1997 | Bellemare et al. |
| 5,704,060 A | 12/1997 | Del Monte |
| 5,706,457 A | 1/1998 | Dwyer et al. |
| 5,717,940 A | 2/1998 | Peairs |
| 5,726,883 A | 3/1998 | Levine et al. |
| 5,732,214 A | 3/1998 | Subrahmanyam |
| 5,754,308 A | 5/1998 | Lopresti et al. |
| 5,760,917 A | 6/1998 | Sheridan |
| 5,764,866 A | 6/1998 | Maniwa |
| 5,764,918 A | 6/1998 | Poulter |
| 5,764,972 A | 6/1998 | Crouse et al. |
| 5,768,483 A | 6/1998 | Maniwa et al. |
| 5,771,101 A | 6/1998 | Bramall |
| 5,784,177 A | 7/1998 | Sanchez et al. |
| 5,790,790 A | 8/1998 | Smith et al. |
| 5,805,298 A | 9/1998 | Ho et al. |
| 5,812,398 A | 9/1998 | Nielsen |
| 5,812,747 A | 9/1998 | Kayano et al. |
| 5,832,474 A | 11/1998 | Lopresti et al. |
| 5,867,597 A | 2/1999 | Peairs et al. |
| 5,870,746 A | 2/1999 | Knutson et al. |
| 5,881,233 A | 3/1999 | Toyoda et al. |
| 5,890,163 A | 3/1999 | Todd |
| 5,893,908 A | 4/1999 | Cullen et al. |
| 5,911,044 A | 6/1999 | Lo et al. |
| 5,933,247 A * | 8/1999 | Shibata ........................ 358/404 |
| 5,948,058 A | 9/1999 | Kudoh et al. |
| 5,978,477 A | 11/1999 | Hull et al. |
| 5,982,507 A | 11/1999 | Weiser et al. |
| 6,020,980 A | 2/2000 | Freeman |
| 6,112,014 A * | 8/2000 | Kane ........................ 358/1.16 |
| 6,115,509 A | 9/2000 | Yeskel |
| 6,219,158 B1 | 4/2001 | Dawe |
| 6,252,588 B1 | 6/2001 | Dawson |

FOREIGN PATENT DOCUMENTS

| | | |
|---|---|---|
| JP | 07-121602 | 5/1995 |
| WO | WO 95/01821 A1 | 1/1995 |

OTHER PUBLICATIONS

PCT International Preliminary Examination Report for GB 96/01471.

* cited by examiner

AUTOMATIC AND TRANSPARENT DOCUMENT ARCHIVING

CROSS-REFERENCES TO RELATED APPLICATION

This application is a continuation of U.S. patent application Ser. No. 09/347,953, filed on Jul. 6, 1999, now U.S. Pat. No. 6,665,086 which is a continuation of U.S. patent application Ser. No. 09/192,168, filed on Nov. 13, 1998 now U.S. Pat. No. 6,684,368. These applications are herein incorporated by reference for all purposes.

STATEMENT OF RELATED APPLICATIONS

The present application is related to the subject matter of the application titled, "DOCUMENT MANAGEMENT SYSTEM" co-assigned with the present application and filed on the same day. The contents of the "DOCUMENT MANAGEMENT SYSTEM" application are herein incorporated by reference for all purposes.

BACKGROUND OF THE INVENTION

The present invention relates to a document management system and more particularly to providing automatic archiving to standard office equipment.

With the rapid development of storage system technology, the cost of storing an image of a sheet of paper on digital media has become less than the cost of printing and storing the sheet of paper itself. Digital document storage also facilitates later electronic search and retrieval and raises the possibility of automatic filing of documents.

Until now, systematic digital document storage has required user discipline to scan in each and every document for the express purpose of archiving. Work has been done to make stand-alone scanners less expensive, easier to use, and more compact. However, the user must still 1) remember that a document should be scanned, 2) locate a scanner, 3) bring the document to the scanner, and 4) operate the scanner. However, scanning occurs constantly in the office environment in the contexts of copying and faxing.

SUMMARY OF THE INVENTION

The present invention provides an automatic archiving system that makes document archiving largely transparent to the user. In one embodiment, documents scanned in or printed during the course of office equipment operation are automatically archived. For example, an office local area network (LAN) may interconnect a copier, a printer, a facsimile machine, and a document management workstation. Whenever a document is copied, printed, or faxed, a document image is archived by the document management workstation without further user intervention. A single user command results in the document being copied and archived, printed and archived, or faxed and archived.

In accordance with a first aspect of the invention, a method for processing document images includes steps of receiving a single user input command and performing certain steps in response to the single user input command. The steps include scanning a document image to collect image data, printing the document image based on the image data, and sending the image data to an archiving system for storage.

In accordance with a second aspect of the invention, a method for printing and archiving documents includes steps of receiving a single user command requesting that a document be printed, printing the document in response to the single user command, and archiving image data representing the document in response to the single user command.

In accordance with a third aspect of the invention, a method for archiving documents to be faxed includes steps of receiving a single user command indicating that a document is to be faxed, scanning the document to be faxed in response to the single user command, transmitting first image data representing the document as scanned to a remote location via a public telephone network, and archiving, in response to the single user command, second image data representing the document as scanned in the scanning step.

In accordance with a fourth aspect of the invention, a computer installation includes a digital copier that scans in documents to be copied, a printer that prints documents, a computer system controlling a long-term storage medium, and a network interconnecting the digital copier, the printer, and the computer system. The digital copier relays image data representing the documents to be copied to the computer system for storage on the long-term storage medium. The printer, or a printer server controlling the printer, or a computer system initiating a command to print relays image data representing printed documents to the computer system for storage on the long-term storage medium.

In accordance with a fifth aspect of the invention, a digital copier includes a scanner that generates image data representing a document to be copied., an image processing unit that processes the image data to correct imaging errors introduced by the scan engine, a printer that copies the document responsive to the image data as processed by the image processing unit, and an image data tap that relays the image data to a storage system for archiving.

A further understanding of the nature and advantages of the inventions herein may be realized by reference to the remaining portions of the specification and the attached drawings.

DESCRIPTION OF SPECIFIC EMBODIMENTS

Overall Architecture for Automatic Archiving

Figure 1:
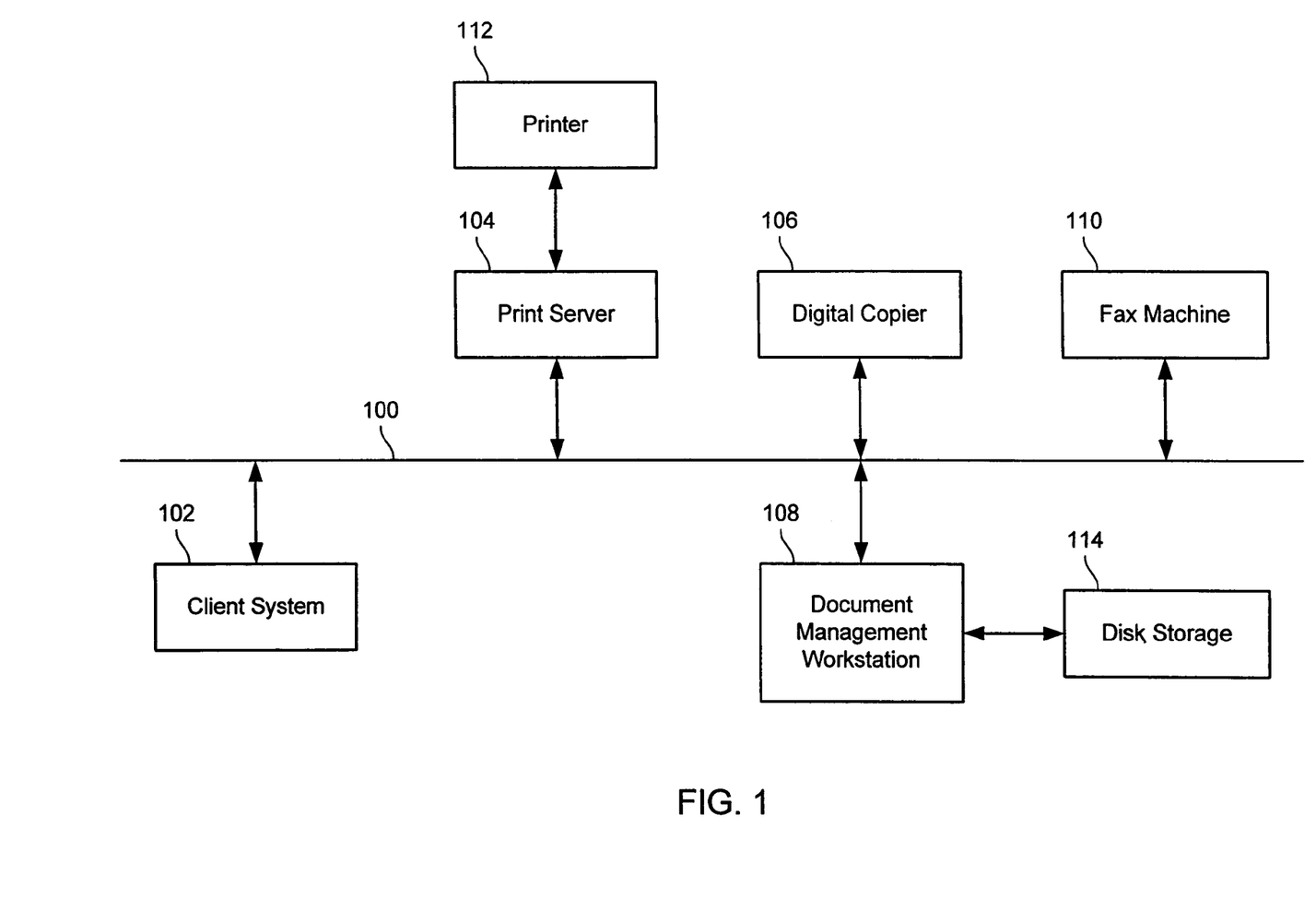
FIG. 1 depicts an office machine network implementing automatic document archiving in accordance with one embodiment of the present invention.

FIG. 1 depicts an office machine network implementing automatic document archiving in accordance with one embodiment of the present invention. A network 100 may be implemented in any way, e.g., an Ethernet. Network 100 interconnects a representative client system 102, a print server 104, a special digital copier 106, a document management workstation 108, and a special facsimile machine 110. Print server 104 controls printing on a representative printer 112 at the request of client system 102 and relays document image data characterizing a document to document management workstation 108 for archiving. Digital copier 106 copies documents and transmits image data obtained during the course of copying to document management workstation 108 for archiving. Similarly, facsimile machine 110 captures image data during the course of sending and receiving documents and transmits the image data to document management workstation 108 for archiving. Document management workstation 108 collects the document image data collected from all of the office equipment and maintains an archive on a disk storage unit 114. Client system 102 may browse this archive.

The configuration of network 100 is of course only representative. For example, automatic archiving of documents may be implemented with only one or two types of office machine instead of the depicted types. Also, functionality of one or more units shown in FIG. 1 may be combined into the same unit or divided among many units.

Automatic Archiving of Copied Documents

Figure 2:
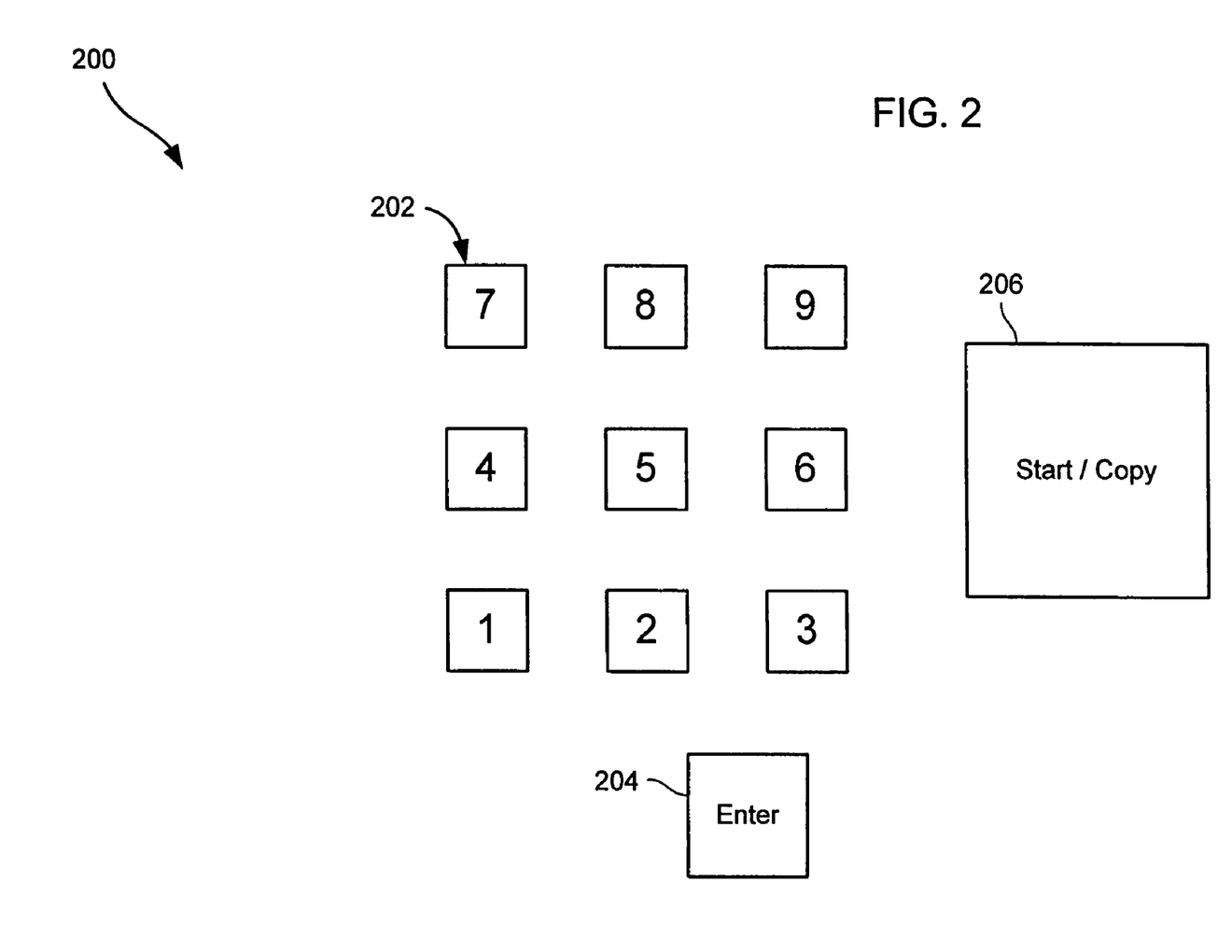
FIG. 2 depicts a portion of a copier control interface.

In accordance with the present invention, digital copier 106 transparently archives documents that are copied. FIG. 2 depicts a simplified representation of a portion of a copier control interface 200 usable with digital copier 106. Copier control interface 200 includes a numeric keypad 202, an Enter key 204, and a Copy/Start key 206. Copier control interface 200 may be implemented using, e.g., a touch pad, touch screen, mechanical buttons, etc. Controls for paper size, copy darkness, copy contrast, paper size, and magnification/reduction ratio are not important to the present invention and are thus omitted.

In accordance with one embodiment of the present invention, activation of Copy/Start key 206 is sufficient to initiate both copying of a document and archiving of an image of the document. The user positions the document, e.g., in a document feeder (not shown), and then enters a personal access code on numeric keypad 202 finishing access code entry by depressing Enter key 204. Depressing Copy/Start key 206 represents a single user command that is interpreted by digital copier 106 to request both copying and archiving. Thus by copying, the user achieves both copying and archiving. In one embodiment, the user may enter a lock-out code to inhibit archiving, for instance, for privacy-protection purposes.

Details of the hardware for the copying and archiving processes will be made clearer with reference to FIGS. 3–5.

Figure 3:
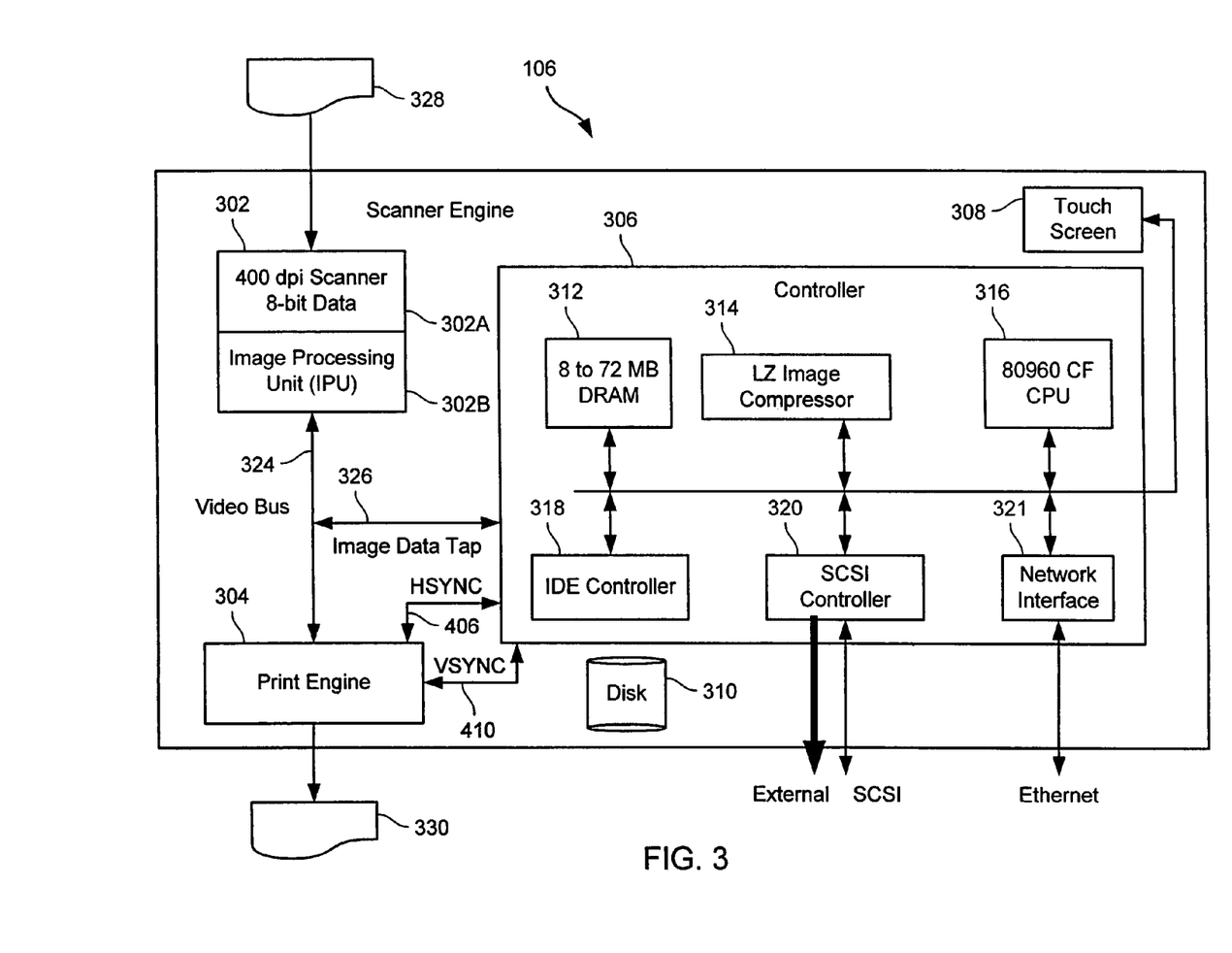
FIG. 3 depicts a top-level diagram of a digital copier implementing automatic document archiving in accordance with one embodiment of the present invention.

FIG. 3 depicts a top-level diagram of digital copier 106 implementing automatic document archiving in accordance with one embodiment of the present invention. Digital copier 106 includes a scanner engine 302, a print engine 304, a controller 306, a touch screen 308, and an internal disk storage unit 310. Controller 306 includes a DRAM unit 312, an LZ image compressor 314, a CPU 316, an IDE controller 318, a SCSI controller 320, and a network interface 321. A bus 323 interconnects the controller elements. Scanner engine 302 includes a scanner 302A and an image processing unit 302B. A video bus 324 interconnects scanner engine 302 and print engine 304. An image data tap 326 provides controller 306 with access to image data transferred over video bus 324. Controller 306 also takes advantage of an HSYNC signal 406 and a VSYNC signal 410 generated within print engine 304.

Digital copier 106 accepts document 328 and prints a copy 330 upon depression of Start/Copy key 206. Scanner 302A captures an image of document 328 and transmits the image to image processing unit 302B. Image processing unit 302B operates to remove distortion inherent in the scanning process. The output of the image processing unit is preferably in a format where 8 bits represent the grey scale level of a pixel, there are 4380 active pixels per line, and there are 3380 active lines per frame or document page. There is a 10 pixel blanking period before and after each active line, making the total number of pixels per line, 4400. Similarly, there is a 10 line blanking period before and after every frame, making the total number of lines in a frame 3400. Of course, these parameters are only design choices.

This pixel data is forward from image processing unit 302B to print engine 304 for printing. The data rate over video bus 324 is preferably 20 MHz. Controller 306 monitors video bus 324 via image data tap 326 to receive the same pixel data. Although, it would be possible to monitor the pixel data prior to image processing unit 302B, the advantage to monitoring on video bus 324 is that image processing unit 302B is tightly coupled to scanner 302A and can monitor and correct for errors inherent in the scanning process.

Controller 306 performs overall control functions for digital copier 106 including the archiving functions. CPU 316, an Intel 80960 CF microcontroller, operates the control program for the operation of digital copier 106. Image data is often transferred into controller 306 at a faster rate via image data tap 326 than the image data can be archived. Accordingly, DRAM unit 312, preferably incorporating 8 to 72 MB of DRAM, acts as a buffer for image data. This allows printing of the copy to continue without interruption by the archiving process.

To save on storage space and facilitate faster data transfer across network 100, LZ image compressor 314 may compress the image data prior to archiving in accordance with the Lempel-Ziv image compression format. Of course, any image compression format may be chosen in accordance with the invention. With each block of image data to be archived, controller 306 incorporates the user ID data received from touch screen 308.

The actual archiving of document images may occur either locally or remotely. Controller 306 may maintain the archive on disk storage unit 310, in which case the image data will be transferred via IDE controller 318. The archive may also be maintained either internally or externally on SCSI drives to which image data is transferred via SCSI controller 320. Note, that if the archive is maintained on disk storage unit 310, or a disk drive accessible via SCSI controller 320, digital copier 106 will absorb some or all of the functionality of document management workstation 108. If the archive is maintained on document management workstation 108, network interface 321 sends the image data there via network 100 along with the user ID data for each particular document. Typically, LZ image compressor 314 is used in applications where documents are archived locally as opposed to remotely.

Figure 4:
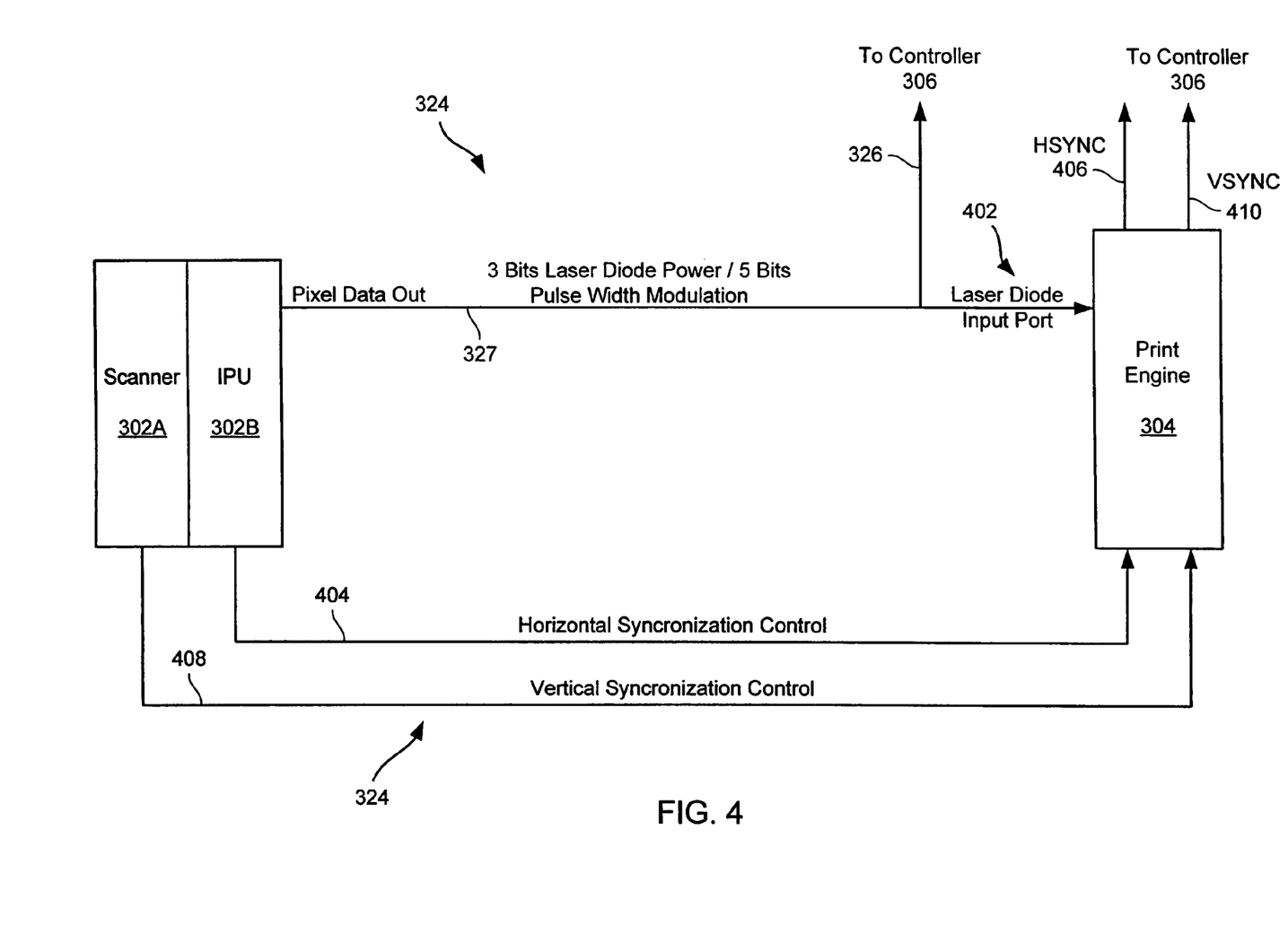
FIG. 4 depicts alternative signals usable for extracting horizontal synchronization data from a digital copier in accordance with one embodiment of the present invention.

FIG. 4 depicts signals transferred over video bus 324 and image data tap 326 in accordance with one embodiment of the present invention. A pixel data line 327 carries the image data generated by image processing unit 302B in a format to drive a laser diode input port 402 of print engine 304. Each pixel includes 8 bits.

Print engine 304 operates in accordance with well known laser xerography principles and incorporates a laser diode that varies in illumination intensity responsive to the document image to be printed. The 8 bits input to laser diode input port 402 includes 3 bits modulating the intensity of illumination of the laser diode and 5 bits modulating the width of illumination pulses. These pixels transfer over a pixel data line 327 at a 20 MHz rate. In the preferred embodiment, the image data presented at laser diode input port 402 is directly relayed to controller 306 via image data tap 326.

The beam output of the laser diode passes through a system of lens and mirrors that generates the horizontal scanning action to sweep the beam over a rotating xerographic drum, thereby recreating the document image as a charge pattern on the drum. Typically, the rotation of a polygonal mirror tracks the scanning action. To assure the highest quality of reproduction, printing requires careful synchronization between the constituent parts of the scanner 302A, image processing unit 302B and the Print Engine 304. This synchronization is signalled using the horizontal and vertical video synchronization signals, lines 404, 406, 408, and 410. All of these signals are interrelated in terms of synchronization to the motion inherent in the rotating polygonal mirror which provides faster scanning in the print engine, and in terms of the scanner 302A. In some embodiments, the timing may be sourced by the print engine 304, and circuitry in image processing unit 302B is phase locked to that timing. In an alternate embodiment, image processing unit 302B may provide the master timing to the print engine 304, which subsequently phase locks or otherwise synchronizes its mechanical motion to these source signals. This embodiment is illustrated in FIG. 4. Those skilled in the art will recognize the various trade offs in product design originating from alternative selections of the master reference timing sources used for generating the synchronization signals in the system of FIG. 4, without losing the generality of obtaining access to the video bus 324.

Horizontal synchronization signal (HSYNC) 406 for the image data may be obtained from print engine 304 in many ways. One technique is to position an optically sensitive sensor at a point within the optical system where the scanning action of the beam may be monitored. A pulse is generated every time the beam reaches an extremity of the scan. Depending on the particular design of the optical system, this pulse rate may be a harmonic or subharmonic of the actual horizontal synchronization rate.

Another technique is to attach an optical encoder to the motor that rotates the polygonal mirror. By monitoring the motor operation in this, or some other way, horizontal synchronization signal 406 may be derived. It is also possible to derive horizontal synchronization signal 406 from the control signal which drives the motor.

A vertical synchronization control 408 also incorporates information about the scanning action of scanner 302A. To assure high quality reproduction, the movement of paper through print engine 304 takes this vertical synchronization control information into account. Vertical synchronization signal 410 may be obtained from print engine 304 in a variety of ways. One way is to tap off an internal signal that gates a new sheet of paper to pass underneath the xerographic drum.

The horizontal and vertical synchronization signals 406 and 410 are used to assure that only valid pixels are archived. Data indicating the number of lines on each page and the line length in pixels is also archived with the pixels. Thus, when the document is retrieved for printing later, printing of the document inherently takes advantage of the information present on vertical synchronization control 408 and horizontal synchronization control 404, namely image position within a page, and more particularly, the size of paper printed upon. Furthermore, the document image has already been subject to sophisticated image processing by IPU 302B. The final printed document is therefore a very high quality reproduction.

The present invention is however not restricted to capturing image data for archiving at the output of an image processing system such as IPU 302B. Whether or not such an image processing system is present, image data for archiving may be captured at the output of scanner 302A.

Automatic Archiving of Printed Documents

Figure 5:
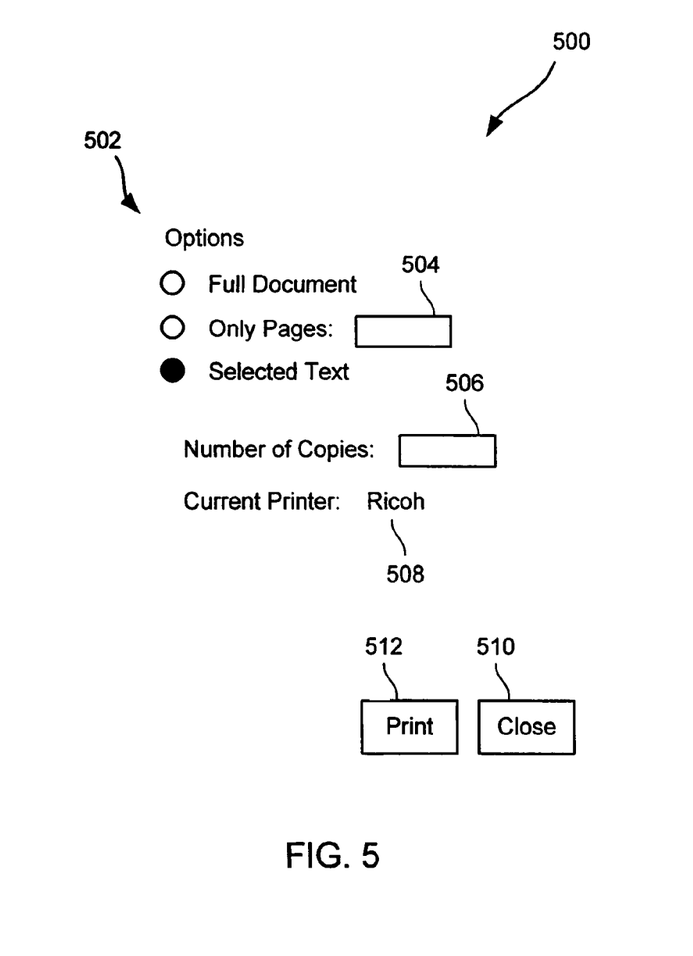
FIG. 5 depicts a printer interface.

FIG. 5 depicts a simplified representation of a user interface screen 500 for operating a printer. A user interface screen such as screen 500 is generally displayed by client system 102 whenever the user requests printing of a document. A list 502 of options permits the user to select whether the full document is to be printed, only a specified range of pages, or only text that has been highlighted using a pointing and selection device such as a mouse. If a range of pages is to be specified, a field 504 is used to enter the range of page numbers. A field 506 permits the user to specify a number of document copies to be printed. A "current printer" field 508 identifies the printer that will be used to print the document. Activation of a "Close" screen button 510 dismisses user interface screen 500.

In the prior art, activation of a "Print" screen button 512 causes a document to be printed. In accordance with one embodiment of the present invention, activation of "Print" button 512 represents a single user command to both print and archive the document. Client system 102 sends the document to be printed to print server 104 which runs print spooling software for writing to printer 112. The print spooling software maintains a queue of print jobs to run. The document may be sent to print server 104 in any format, such as text, TIFF, GIF, postscript, etc. Printer 112 will typically accept postscript input but other printer configurations are also possible. If the format of transmission by client system 102 is different from the format accepted by printer 112, printer server 104 will also perform format conversion.

In accordance with the invention, each document handled by print spooling software is sent to document management workstation 108. The document may be transmitted in either the format generated by client system 102 or any format to which printer server 104 is able to convert. The document may be sent to document management workstation 108 with data identifying the current user of client system 102. Thus, archiving becomes an incidental consequence of the printing process. Previously printed documents are retrievable.

Automatic Archiving of Faxed Documents

Figure 6:
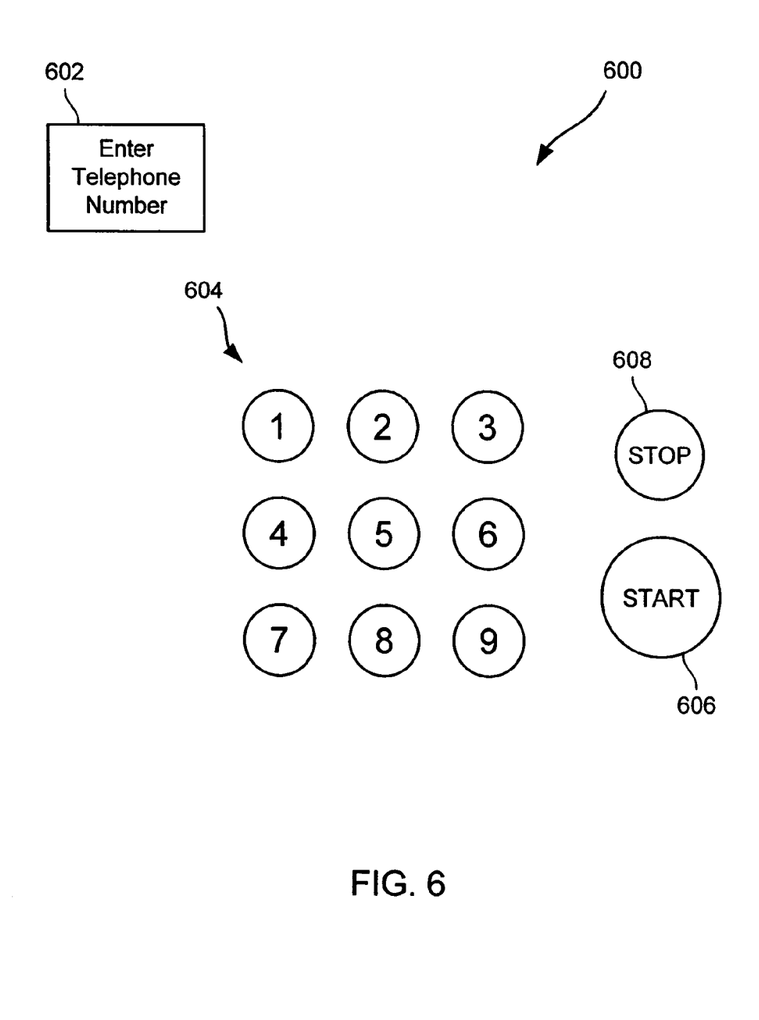
FIG. 6 depicts a facsimile machine interface.

FIG. 6 depicts a simplified representation of a facsimile machine user interface 600. A display screen 602 provides the user with prompts. A keypad 604 allows for entry of a telephone number to which a document is to be faxed. Depression of a start button 606 causes a document to be scanned into a memory within a facsimile machine or, if a document has already been scanned into memory and a telephone number has been entered, causes the document to be faxed to the entered telephone number. Depression of a stop button 608 causes faxing to cease. In accordance with the present invention, depression of start button 606 at the appropriate time represents a single user command to both fax and archive a document.

Figure 7:
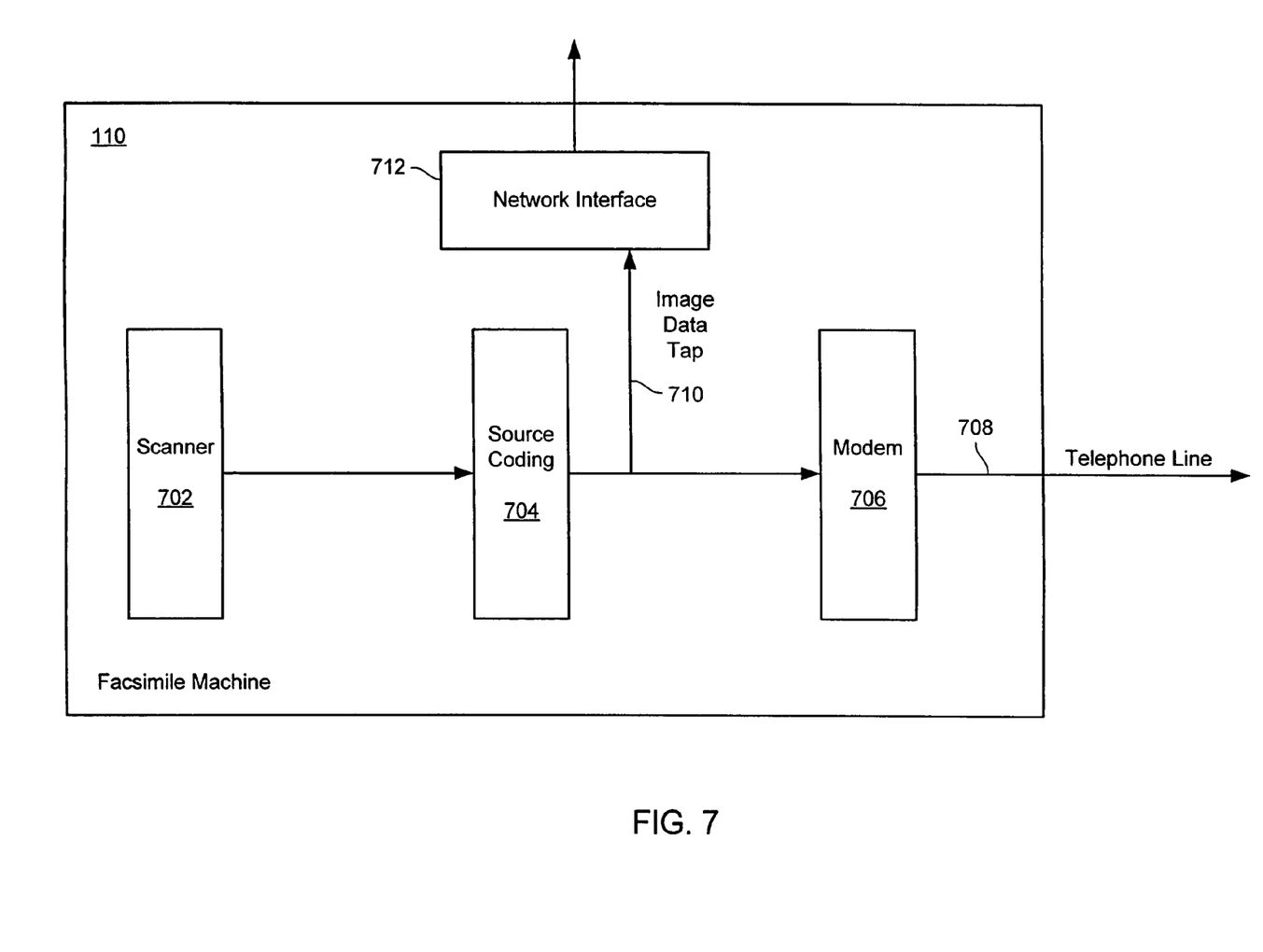
FIG. 7 depicts a facsimile machine modified for automatic archiving in accordance with one embodiment of the present invention.

FIG. 7 depicts facsimile machine 110 modified for automatic archiving in accordance with one embodiment of the present invention. Facsimile machine 10 incorporates a scanner 702 for scanning a document to be faxed and storing a binary pixel representation of the document in a memory (not shown) internal to scanner 702. A source coding unit 704 compresses the gray scale pixel data in accordance with facsimile transmission standard, e.g., Group III. A modem 706 modulates a carrier with the compressed data output of source coding unit 704 in accordance with the relevant facsimile transmission standard to generate a modulated signal to output on a telephone line 708.

In accordance with one embodiment of the present invention, an image data tap 710 transmits the compressed data output of source coding unit to a network interface 712. Network interface 712 in turn sends the compressed data output representing a document to document management workstation 108 for archiving. In an alternative embodiment, image data tap 710 is instead positioned at the output of scanner 702.

Optionally, the user enters a code number on keypad 604 to identify himself or herself. This information is also sent to document management workstation 108 to be stored with the faxed document. Alternatively, the identity of the user of facsimile machine 110 is already known in some other way.

Thus, every document that is faxed is also archived without further user input. This provides yet another source of document images for the archive maintained by document management workstation 108.

Document Management Workstation

Figure 8:
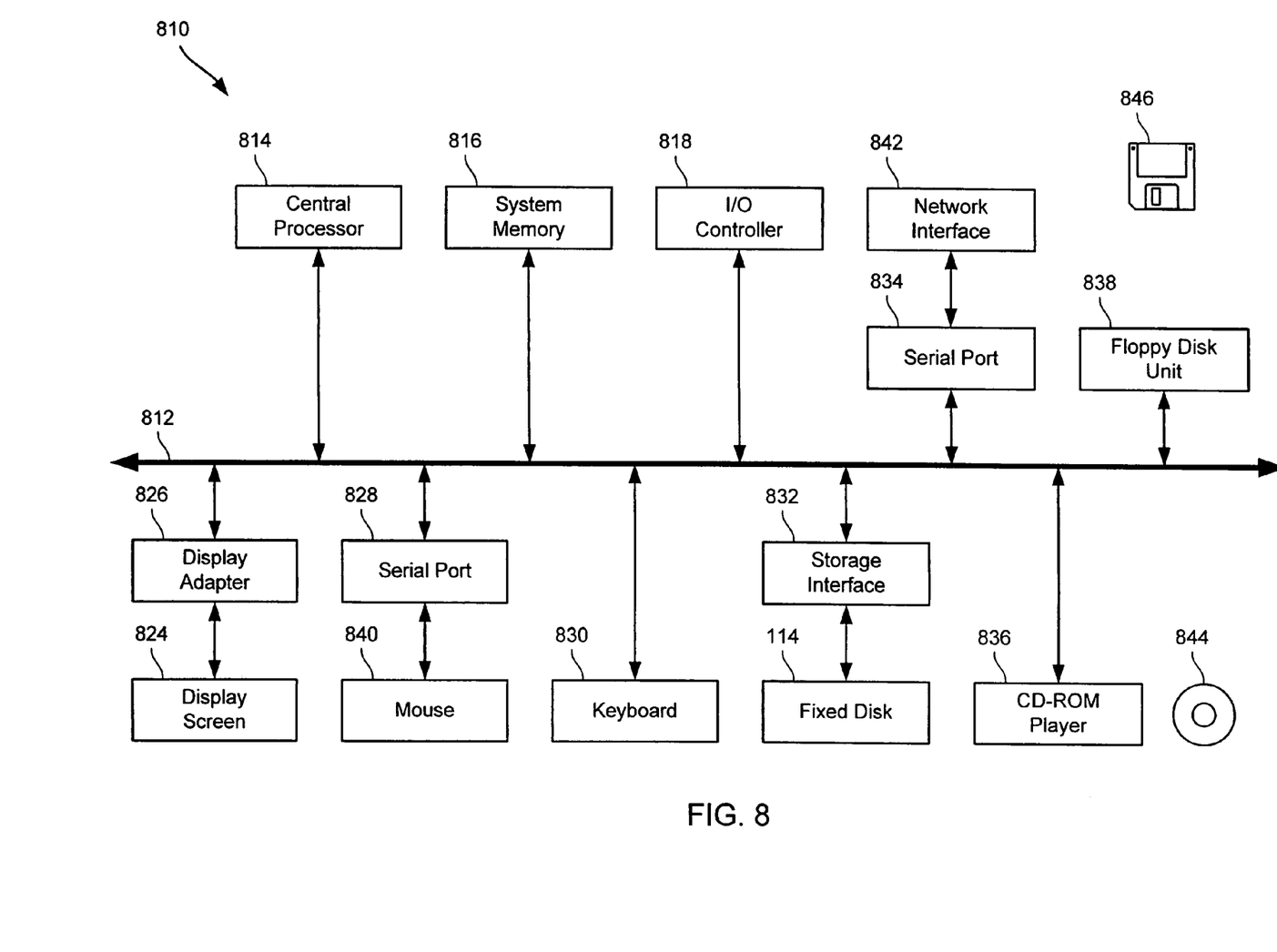
FIG. 8 depicts a computer system usable for implementing elements of the present invention.

FIG. 8 depicts a computer system 810 usable for implementing any one or more of client system 102, print server 104, or document management workstation 108 in accordance with one embodiment of the present invention. Computer system 810 includes bus 812 which interconnects major subsystems such as central processor 814, system memory 816, input/output (I/O) controller 818, external device such as display screen 824 via display adapter 826, serial port 828, keyboard 830, fixed disk drive 114 via a storage interface 832, a serial port 834, a CD ROM player 836, and a floppy disk drive 838. A mouse 840 may connect to serial port 828. A network interface 842 for connection to network 100 may connect to serial port 834. CD ROM player 836 receives a CD ROM disk 844. Floppy disk drive 838 receives a floppy disk 846. Many other devices or subsystems (not shown) may be connected in a similar manner. Also, it is not necessary for all of the devices shown in FIG. 8 to be present to practice the present invention, as discussed below. The devices and subsystems may be interconnected in different ways from that shown in FIG. 8. The operation of a computer system such as that shown in FIG. 8 is readily known in the art and is not discussed in detail in the present application. Source code to implement elements of the present invention may be operably disposed in system memory 816 or stored on storage media such as fixed disk 114, floppy disk 846, or CD ROM 844.

Figure 9:
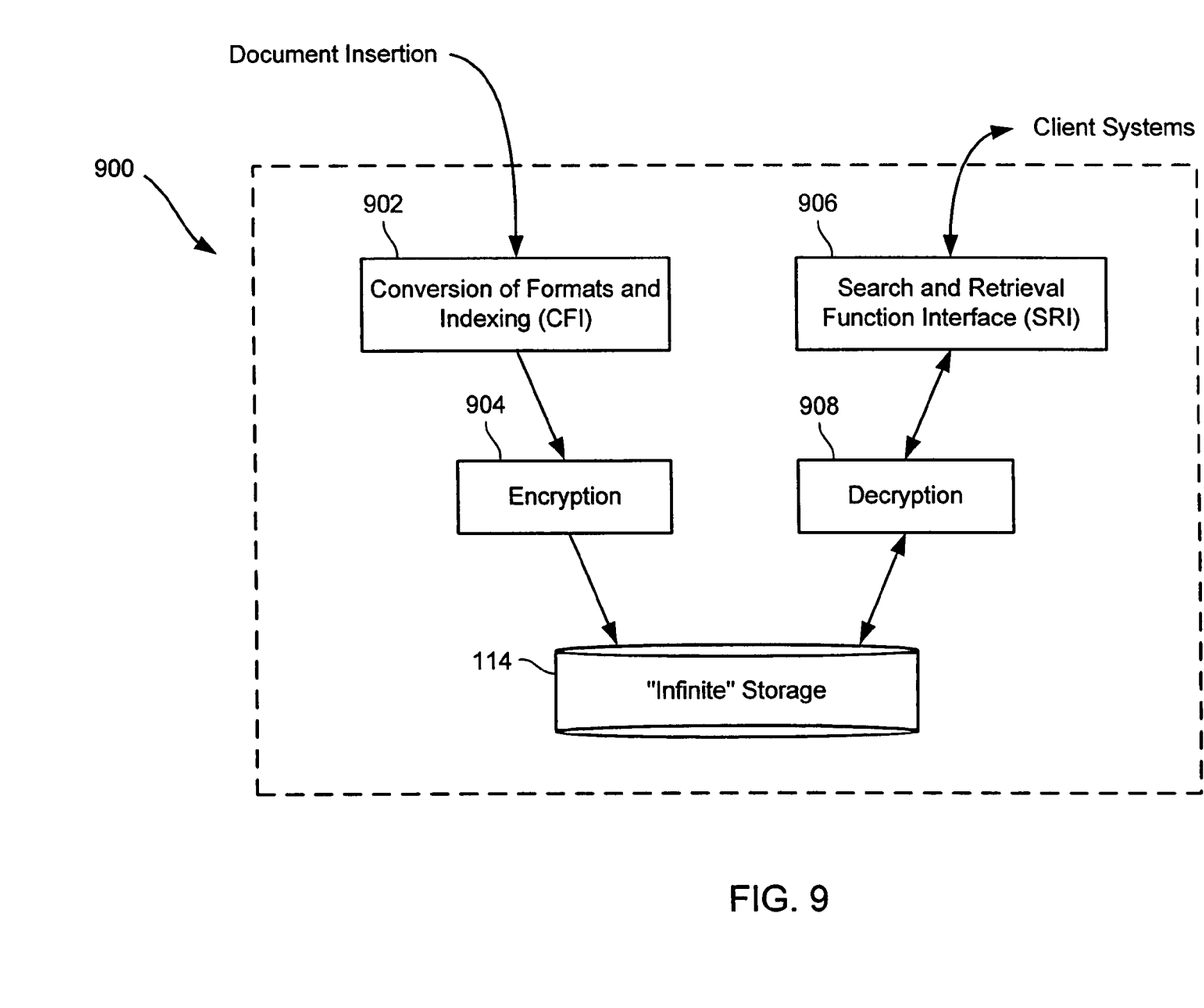
FIG. 9 depicts a software architecture for operating a document image database in accordance with one embodiment of the present invention.

FIG. 9 depicts a software architecture 900 for operating a document image database in accordance with one embodiment of the present invention. Preferably, the software architecture operates on document management workstation 108. Documents to be archived are received by a CFI (conversion of formats and indexing) module 902 from any one of digital copier 106, print server 104, or facsimile machine 110. CFI module 902 converts the format of the received document to a desired format for storage. CFI module 902 may, e.g., receive the data in the 8 bit pixel format discussed in reference to digital copier 106 along with synchronization information useful for high quality reproduction. These desired formats include, e.g., postscript, 8 dpi GIFF, 72 dpi GIFF, 400 dpi TIFF, and plain text. Converting from a graphic format to plain text includes the process of optical character recognition. CFI module 902 also applies an indexing system to the documents to be archived. For plain text documents, the index information generated for the document facilitates later full text searching. If the identity of the user is available, this will also form a part of the indexing information for the document to facilitate later retrieval by the user.

For each document to be archived, a separate HTML document is generated with an iconic form of the images (8 dpi GIF) to be archived and keywords from a text document that is stored. One set of HTML index pages is maintained for each user. Each HTML index page in the set provides a different view of the images in a user's database. For example, one page provides a sequential listing of every saved image, including the document icons. Another page provides a sequential listing of all the documents which shows an ASCII summary of each image without showing the icons. CFI module 902 performs the necessary conversions.

An encryption module 904 optionally encrypts the document to be archived and its HTML counterpart with an encryption key particular to the user. This way only the user and other authorized parties may retrieve the encrypted document. The encrypted documents are stored on disk storage unit 114.

An SRI module (search and retrieval interface) module 906 provides access to the document archive maintained on disk storage unit 114. Decryption system 908 is provided as an option for encrypted documents. SRI module 906 is implemented as an HTTP daemon operating on document management workstation 108. SRI module 906 is preferably the only search and retrieval path to the document archive. This restricted form of access allows log access information to be maintained. SRI module 906 processes HTTP requests from client system 102 to browse HTML documents on disk storage unit 114, or to search and retrieve the archived documents. Full text search is implemented with a WAIS engine or other search engine (e.g., VERIFY, EXCALIBUR, FULCRUM) implemented with SRI module 906. Queries are entered by the user in an HTML form and transmitted to the search engine using a CGI script running in SRI module 906. An initial user request should incorporate a password to authorize decryption by decryption system 908.

To facilitate user interaction with SRI module 906, client system 102 preferably runs a Java-capable world wide web browser such as Netscape Navigator obtainable from Netscape Communications of Mountain View, Calif. Java programs may be downloaded from SRI module 906 to perform functions such as searching or display and printing of particular document formats.

Of course, the storage and retrieval architecture discussed above is only representative. The co-filed application "DOCUMENT MANAGEMENT SYSTEM" includes many other applications of an automatic archiving system.

In the foregoing specification, the invention has been described with reference to specific exemplary embodiments thereof. It will, however, be evident that various modifications and changes may be made thereunto without departing from the broader spirit and scope of the invention as set forth in the appended claims. Many such changes or modifications will be readily apparent to one of ordinary skill in the art. For example, digital copier 106 may also act as a printer for client system 102. Also, the network 100 may include connections over a WAN or the Internet, allowing remote archiving and retrieval of documents. The specification and drawings are, accordingly, to be regarded in an illustrative rather than a restrictive sense, the invention being limited only by the provided claims and their full scope of equivalents.

What is claimed is:

1. A method for processing document images, the method comprising:
   receiving a single user input designated for a first function a user wants to perform on a document; and
   responsive to the single user input, performing the following steps:
      determining, from the single user input and transparent to the user, that a second archiving function should be performed in addition to the first function;
      scanning a document to generate electronic image data corresponding to the document;
      performing the first function; and
      in response to the determination that the second archiving function should be performed, performing the second archiving function without requiring further user interaction, the second archiving function archiving the electronic image data in at least one database.

2. The method of claim 1, wherein archiving the electronic image data comprises storing the image data in the at least one database that is local to a device that performed the first function.

3. The method of claim 1, wherein archiving the electronic image data comprises storing the image data in the at least one database that is remote to a device that performed the first function.

4. The method of claim 1, further comprising:
   receiving a user identifier for the user; and
   storing the user identifier along with the stored image data.

5. The method of claim 1, wherein a printer performs the first function and performing the first function comprises printing the document.

6. The method of claim 1, wherein a facsimile machine performs the first function and performing the first function comprises faxing the document.

7. The system of claim 1, wherein a copier perform: the first function and performing the first function comprises generating a copy of the document.

8. A method for processing document images, the method comprising:
   receiving a single user input designated for a first function a user wants to perform on a document; and
   responsive to the single user input, performing the following steps:
      determining, from the single user input and transparent to the user, that a second archiving function should be performed in addition to the first function;
      scanning a document to generate electronic image data corresponding to the document;
      performing the first function; and
      in response to the determination that a second archiving function should be performed and without requiring further user interaction,
         compressing the electronic image data; and
         performing the second archiving function, the second archiving function archiving the compressed electronic image data in at least one database.

9. The method of claim 8, wherein a printer performs the first function and performing the first function comprises printing the document.

10. The method of claim 8, wherein a facsimile machine performs the first function and performing the first function comprises faxing the document.

11. The system of claim 8, wherein a copier performs the first function and performing the first function comprises generating a copy of the document.

12. The method of claim 8, wherein archiving the electronic image data comprises storing the image data in the at least one database that is local to a device that performed the first function.

13. The method of claim 8, wherein archiving the electronic image data comprises storing the image data in the at least one database that is remote to a device that performed the first function.

14. A method for processing document images, the method comprising:
   receiving a single user input designated for a first function a user wants to perform on a document; and
   responsive to the single user input, performing the following steps:
      determining, from the single user input and transparent to the user, that a second archiving function should be performed in addition to the first function;
      scanning a document to generate electronic image data corresponding to the document;
      performing the first function;
      response to the determination that a second archiving function should be performed and without requiring further user interaction,
         encrypting the electronic image data; and
         performing the second archiving function, the second archiving function archiving the encrypted electronic image data in at least one database.

15. The method of claim 14, wherein a printer performs the first function and performing the first function comprises printing the document.

16. The method of claim 14, wherein a facsimile machine performs the first function and performing the first function comprises faxing the document.

17. The system of claim 14, wherein a copier performs the first function and performing the first function comprises generating a copy of the document.

18. The method of claim 14, wherein archiving the electronic image data comprises storing the image data in the at least one database that is local to a device that performed the first function.

19. The method of claim 14, wherein archiving the electronic image data comprises storing the image data in the at least one database that is remote to a device that performed the first function.

20. A device for performing unconscious archiving, the device comprising:
   an input to receive a single user input, the input designated for a first function a user wants to perform;
   a scanner engine configured to scan a document and generate image data for the document;
   an output engine configured to perform the first function the user wants to perform in response to the single user input;

logic to determine, from the single user input and transparent to the user, that a second archiving function should be performed in addition to the first function;

a second archiving function engine configured to perform the second archiving function in response to the determination that a second archiving function should be performed and without requiring further user interaction, the second archiving function including archiving the generated image data in a database.

21. The device of claim 20, wherein the database is local to the device.

22. The device of claim 20, wherein the database is remote to the device.

23. The device of claim 20, wherein device comprises a printer and the first function comprises printing the document.

24. The device of claim 20, wherein the device comprises a facsimile machine and the first function comprises faxing the document.

25. The device of claim 20, wherein the device comprises a copier and the first function comprises generating a copy of the document.

26. The device of claim 20, further comprising a compressor configured to compress the image data, wherein the second archiving function engine archives the compressed image data.

27. The device of claim 20, further comprising an encrypter configured to encrypt the image data, wherein the second archiving function engine archives the encrypted image data.

28. A method for processing document images, the method comprising:

receiving a single user input designated for a first function a user wants to perform on a document;

scanning a document to generate electronic image data corresponding to the document;

performing the first function; and automatically performing a second archiving function without requiring further user interaction, the automatically performing step being transparent to the user, the second archiving function archiving the electronic image data in at least one database.

* * * * *